United States Patent [19]

Wei

[11] Patent Number: 4,483,012
[45] Date of Patent: Nov. 13, 1984

[54] DIFFERENTIALLY CONVOLUTIONAL CHANNEL CODING WITH EXPANDED SET OF SIGNALLING ALPHABETS

[75] Inventor: Lee-Fang Wei, Matawan, N.J.

[73] Assignee: AT&T Information Systems, Holmdel, N.J.

[21] Appl. No.: 486,081

[22] Filed: Apr. 18, 1983

[51] Int. Cl.³ .......................... H04L 5/12; H04L 1/10
[52] U.S. Cl. ........................................ 375/27; 371/43; 375/39
[58] Field of Search ............... 375/27, 38, 39; 371/43, 371/44, 45; 178/113; 332/9 R

[56] References Cited

U.S. PATENT DOCUMENTS

| | | | |
|---|---|---|---|
| 4,077,021 | 2/1978 | Csajka et al. | 332/9 R |
| 4,114,710 | 9/1978 | Katoh et al. | 375/39 |
| 4,208,739 | 6/1980 | Lu et al. | 371/43 |
| 4,346,472 | 8/1982 | Ohkashi et al. | 371/43 |

OTHER PUBLICATIONS

"The Viterbi Algorithm", *Proc. of IEEE*, vol. 61, No. 3, Mar. 1971, by G. D. Forney, pp. 268-278.
"Jointly Adaptive Equalization and Carrier Recovery in Two-Dimensional Digital Communication Systems", *BSTJ*, vol. 55, No. 3, Mar. 1976, By D. D. Falconer, pp. 317-334.
"Channel Coding with Multilevel/Phase Signals", *IEEE Trans. on Information Theory*, vol. IT-28, No. 1, Jan. 1982, by G. Ungerboeck, pp. 55-67.

*Primary Examiner*—Benedict V. Safourek
*Attorney, Agent, or Firm*—B. H. Freedman

[57] ABSTRACT

A technique for converting a sequence of binary digits into a sequence of signalling alphabets of a modulated carrier signal for data transmission. By introducing additional redundant signalling alphabets and differentially coding incoming data in a state-dependent sequential manner, enlarged minimum Euclidean distance between possible sequences of signaling alphabets is achieved while phase ambiguity of the expanded set of signalling alphabets is removed. This results in a reduced error probability when maximum likelihood decoding is applied in the receiver.

6 Claims, 10 Drawing Figures

NUMBER BELOW POINT: $Y_{n,0}$ $Y_{n,1}$ $Y_{n,2}$ $Y_{n,3}$ $Y_{n,4}$

NUMBER BELOW POINT: $Y_{n,0}\ Y_{n,1}\ Y_{n,2}\ Y_{n,3}\ Y_{n,4}$

DIFFERENTIALLY CONVOLUTIONAL CHANNEL CODING WITH EXPANDED SET OF SIGNALLING ALPHABETS

BACKGROUND OF THE INVENTION (a) Field of the Invention

This invention pertains generally to encoding of binary signals, and in particular, to a technique of encoding a sequence of bits for transmission on a quadrature amplitude modulated (QAM) carrier signal, in which convolutional encoding and mapping of the encoder output to an expanded set of signalling alphabets are used to reduce the effect of channel impairments without sacrificing data rate or requiring more bandwidth, and in which differential encoding is used to remove the phase ambiguity of the expanded set of signalling alphabets.

(b) Description of the Prior Art

U.S. Pat. No. 4,077,021 issued to I. P. Csajka and G. Ungerboeck on Feb. 18, 1978, which is incorporated herein by reference, describes a technique for converting a sequence of binary digits into a sequence of signalling alphabets of a modulated carrier signal for data transmission. The invention is intended to allow recovery of the original data even in situations where the transmission medium is severly impaired. Generally speaking, the Ungerboeck's invention involves applying groups of r input bits to a finite state machine which is arranged to expand each input group into an r+1 bit group in accordance with predetermined logical combinations with certain bits in previous groups. The number P of bits stored in the encoder that are used to form the encoder output determine the number $m(=2^P)$ of states that the encoder may assume. Transitions from each encoder state to other states must follow prescribed rules. Accordingly, when the output of a convolutional encoder is subsequently used to modulate a carrier signal in accordance with in-phase and quadrature phase coordinates obtained by mapping the output of the convolutional encoder to an "expanded" set of $2^{r+1}$ signalling alphabets (sometimes referred to as a signal constellation), the sequence of signalling alphabets must follow prescribed rules. (The constellation is referred to as "expanded" because, conventionally, in order to transmit r bits in a signalling interval, a signal constellation of $2^r$ signalling alphabets would suffice.) At the receiver, the effect of impairments in the transmission medium which would otherwise impede data recovery are largely overcome by a maximum-likelihood decoding algorithm which determines the correct transmitted data using knowledge of the valid sequences of signalling alphabets. A discussion of one such decoding algorithm is contained in a paper by G. D. Forney Jr. entitled "The Viterbi Algorithm", *Proc. of IEEE*, Vol. 61, No. 3, March 1973, pp. 268–78.

Despite the advantages obtained by use of the encoding technique described by Csajka and Ungerboeck, phase hits or jumps occurring in the transmission medium may result, after recovery of equalization and carrier, in a rotation of the received signalling alphabets as compared to the initial determination of phase. This ambiguity in phase can cause errors in all subsequently received data and thereby seriously degrade the performance of the system. To avoid this problem, it would be desirable to apply a differential encoding technique to the original input data so that the received signalling alphabets, even after a rotation, can be used to recover the original data. However, to date, it has not been thought possible to combine, in a single system, the advantages of encoding as taught by Csajka Ungerboeck with a differential encoding technique.

In view of the foregoing, it is the broad object of the present invention to provide a technique and apparatus for converting a sequence of binary digits into a sequence of signalling alphabets of a modulated carrier for transmission on a medium subject to impairments such as phase hits and phase jumps, so that the original data can be accurately recovered. Specifically, it is desired to combine the advantages obtained by Csajka encoding as taught by Ungerboeck with those associated with differential encoding.

SUMMARY OF THE INVENTION

In accordance with the present invention, a binary signal, which may be initially scrambled in accordance with known techniques, is applied to a differential encoder which transforms each group of r input bits into an associated group of r differentially encoded bits, which is functionally related to the values of the current r input bits and some of the previous differentially encoded bits. The r bit output of the differential encoder is then applied to a convolutional encoder which expands each group into r+1 bits in accordance with the state of an internal logic arrangement which includes one or more memory elements; the output of the convolutional encoder permits only certain sequences of r+1 bit outputs. The r+1 bit word is then used to determine coordinates $a_n$ and $b_n$ which respectively determine the amplitudes of the in-phase and quadrature phase carriers. Conceptually, these coordinates are determined by mapping each r+1 bit word output from the convolutional encoder to a signalling alphabet in an expanded signal constellation of $2^{r+1}$ signalling alphabets using a mapping strategy which insures that (1) the minimum distance between sequences of signalling alphabets corresponding to the sequences of r+1 bit outputs of the convolutional encoder is maximized and (2) if the sequence of signalling alphabets at the output of the mapping device is rotated by 180 degrees (or equivalently, the coordinates $a_n$ and $b_n$ of all the mapped signalling alphabets are inverted), the original input sequence of binary digits to the differential encoder can be recovered by applying the corresponding convolutional decoding and differential decoding operations to the sequence of received rotated signalling alphabets. Alternatively, the second principle recited above may be expressed as requiring that the effect of inversion of certain bits at the input to the convolutional encoder must be the same as a 180 degree rotation of the sequence of signalling alphabets at the output of the mapping device.

BRIEF DESCRIPTION OF THE DRAWING

The features and advantages of the present invention will be more fully appreciated by reference to the following detailed description when read in light of the accompanying drawings, in which.

DETAILED DESCRIPTION

Figure 1:
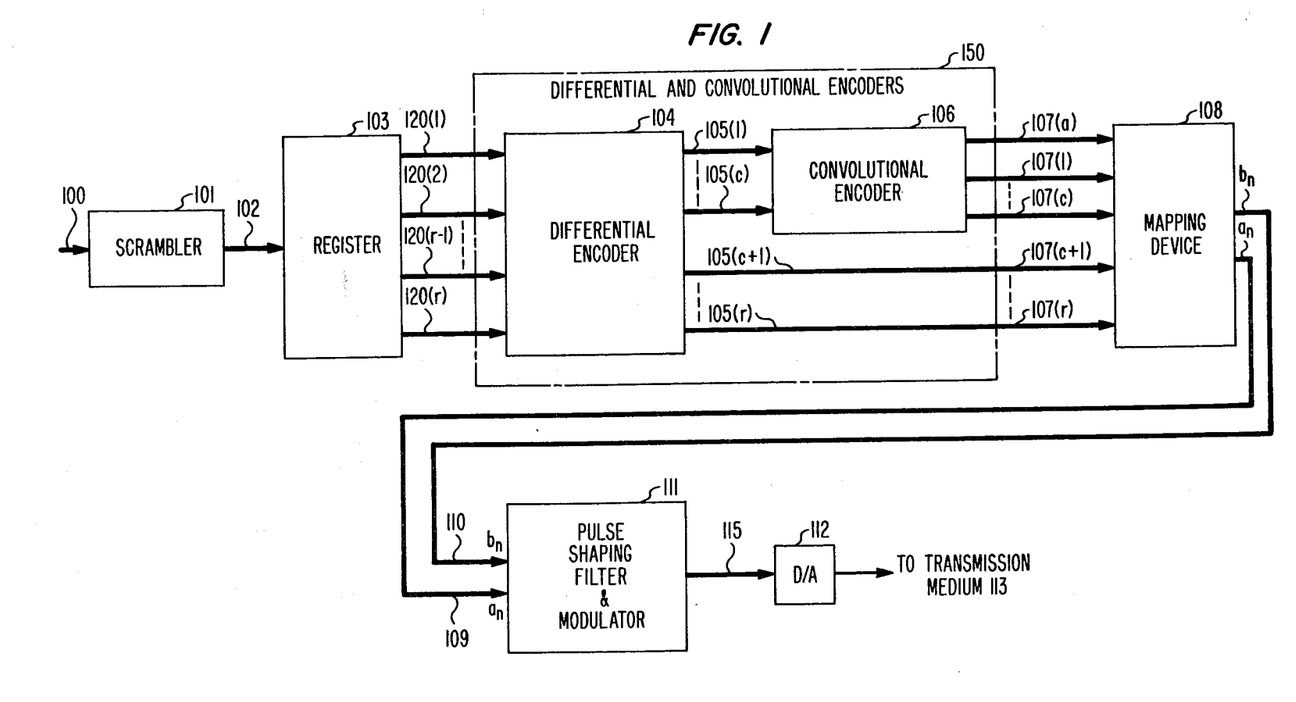
FIG. 1 is an overall block diagram of a transmitter arranged in accordance with the principles of the present invention.

Referring first to FIG. 1, there is shown in block diagram form a transmitter structure arranged in accordance with the present invention to modulate a carrier signal in accordance with a sequence of binary digits. An input bit sequence on line 100, typically consisting of a series of 1's and 0's or a series of 1's and −1's, may optionally be applied to a conventional scrambler 101 which is arranged to provide an output bit sequence on line 102 representing the original data. The scrambler output is grouped in r-bit groups, for example by a serial in/parallel out register 103. Each r bit group on lines 120(1) through 120(r) is then applied to a differential encoder 104, which is arranged to differentially encode some or all of the input bits, and to provide r output bits on lines 105(1) through 105(r). Differential encoding is accomplished by logically combining the selected ones of the current input bits with some of the previous outputs from encoder 104.

As shown in FIG. 1, C of the differentially encoded bits output from encoder 104 on lines 105(1) through 105(C), respectively, are applied to a convolutional encoder 106, examples of which are described below, which is arranged to expand each C-bit group at its input into a corresponding C+1 bit group in accordance with the values of the applied inputs and selected previous inputs. Typically, C is an integer greater than zero and less than r, but in some circumstances, all of the outputs of encoder 104 may be applied to encoder 106. Subsequently, the r+1 bits consisting of the C+1 bits output from convolutional encoder 106 on lines 107(0) through 107(C), together with inputs on lines 107(C+1) through 107(r) which are taken from the remaining r-C bits output from differential encoder 104 on lines 105(C+1) through 105(r) are used to determine coordinates $a_n$ and $b_n$ on lines 109 and 110 which respectively determine the amplitudes of in-phase and quadrature phase carriers which are combined for application to an analog transmission medium 113. Determination of the values of $a_n$ and $b_n$ is performed by mapping device 108, described in more detail below, which associates each possible combination of the r+1 bits with a particular signalling alphabet in an expanded signal constellation of $2^{r+1}$ signalling alphabets. The precise association of each possible combination of the r+1 bits with an alphabet is performed in accordance with specified rules which allow the original data to be recovered in the receiver (1) with a significant coding gain, and (2) without significant losses due to phase ambiguity of the expanded set of signalling alphabets. Gain occurs because the minimum distance among the allowable sequences of signalling alphabets is enlarged, thus providing more margin before channel impairments destroy the ability of the receiver to recover the original data. Phase ambiguity of the expanded set of signalling alphabets is removed by use of differential encoding in conjunction with a specified strategy for mapping the convolutional encoder output to the signalling alphabet.

The sequence of coordinates $a_n$ and $b_n$ are thereafter processed conventionally in pulse-shaping filer and modulator 111, which generates a digital output on line 115 which is converted to analog form in D/A converter 112 before being applied to analog transmission medium 113.

Figure 2:
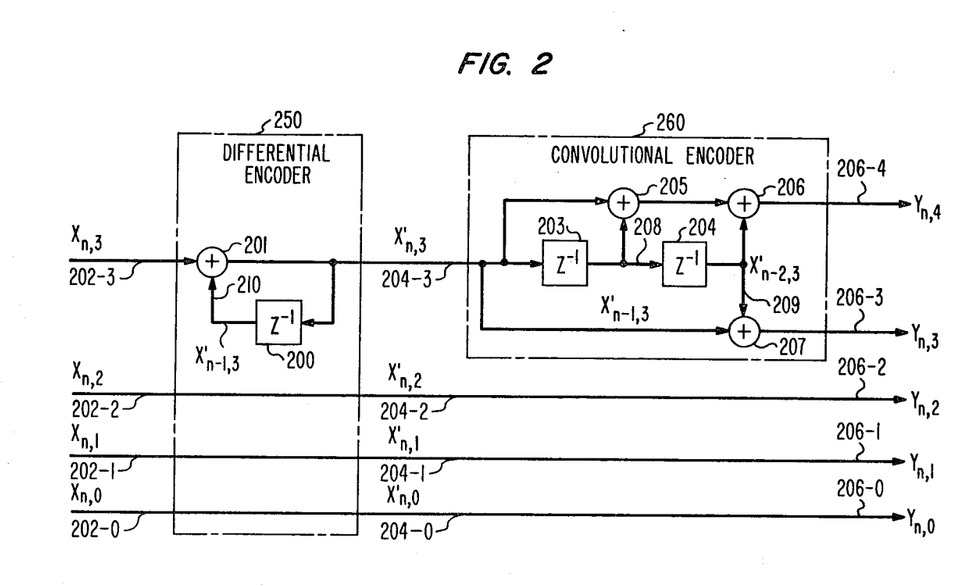
FIG. 2 is a detailed logic diagram of one embodiment of differential encoder 104 and convolutional encoder 106 of FIG. 1.

FIG. 2 illustrates a specific example of logic elements that can be used to first differentially encode and then convolutionally encode a binary sequence when r is 4 and C is 1. The logic of FIG. 2 thus performs the operations associated with encoders 104 and 106 within block 150 of FIG. 1. Further examples of logic elements used to implement encoders 104 and 106 are described below. In FIG. 2, the r outputs of register 103 of FIG. 1 which are applied as inputs to differential encoder 250, have been renumbered, such that output 120(1) corresponds to input 202-3, output 120(2) corresponds to input 202-2, output 120(3) corresponds to input 202-1 and output 120(r) corresponds to input 202-0. The bits appearing on lines 202-0 through 202-3 are designated $x_{n,0}$, $x_{n,1}$, $x_{n,2}$ and $x_{n,3}$, respectively, where the subscript n is an index used to indicate bits in the r bit group arrived in the current signalling interval, bits in the previous group having subscript n−1, and bits in the twice delayed group having subscript n−2. Differential encoder 250 is arranged such that a single input bit $x_{n,3}$ on line 202-3 is differentially encoded by combining it in an exclusive OR gate 201 with the previous output $x'_{n-1,3}$ from gate 201 which is stored in a one group interval delay element 200 and applied to the second input of gate 201 on line 210. The differentially encoded output on line 204-3 is designated $x'_{n,3}$, the prime indicating differentiation. Three remaining input bits $x_{n,0}$ through $x_{n,2}$ applied on lines 202-0 through 202-2 are not differentially encoded but are nevertheless designated outputs $x'_{n,0}$, $x'_{n,1}$ and $x'_{n,2}$ on lines 204-0 through 204-2, respectively, for consistency.

In the embodiment of FIG. 2 in which the value of C is selected as 1, a single output $x'_{n,3}$ from differential encoder 250 on line 204-3 is next applied to a convolutional encoder 260 which expands each differentially encoded bit into a two bit output in accordance with the values of preselected previous inputs from encoder 250 on line 204-3. The remaining outputs $x'_{n,0}$ through $x'_{n,2}$ from differential encoder 250 on lines 240-0 through 240-2 are extended to the input to mapping device 108 of FIG. 1 without any processing. These bits appear on lines 206-0 through 206-2 and are redesignated as bits $y_{n,0}$ through $y_{n,2}$, respectively, for consistency.

In FIG. 2 the differentially encoded bit $x'_{n,3}$ at the input to the convolutional encoder 260 is combined in a first exclusive OR gate 205 with the previous differentially encoded bit $x'_{n-1,3}$ (obtained from delay element 203) and the output of gate 205 is combined in a second exclusive OR gate 206 with the twice delayed differentially encoded bit $x'_{n-2,3}$ (obtained from delay element 204) to form the first output $y_{n,4}$ of encoder 260 on line 206-4. The differentially encoded bit $x'_{n,3}$ is also combined in a third exclusive OR gate 207 with $x'_{n-2,3}$ to yield the second output $y_{n,3}$ on line 206-3. Delay elements 203 and 204 each provide a delay equal to one signalling interval.

Figure 3:
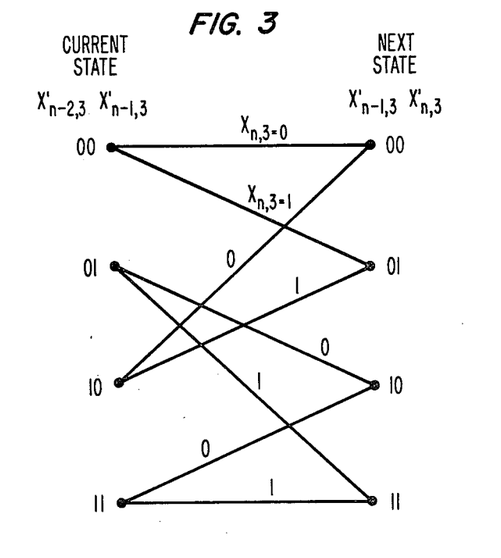
FIG. 3 is a diagram illustrating the state transitions allowed in convolutional encoder 260 of FIG. 2.

The operation of convolutional encoder 260 of FIG. 2, which is equivalent to the encoder shown in FIG. 5 of the above-cited Ungerboeck patent, will be better appreciated by reference to the state transition diagram shown in FIG. 3. As seen in FIG. 2, encoder 260 uses two previous input bits $x'_{n-1,3}$ and $x'_{n-2,3}$ received on line 204-3 and delayed in delay elements 203 and 204 by one and two signalling intervals, respectively, to form its outputs. Since the two stored bits can be combined in four combinations, encoder 260 is referred to as a four state coder. The four states are designated 00, 01, 10 and 11, where the two bit state designation corresponds to the values $x'_{n-2,3}$ and $x'_{n-1,3}$, respectively. Because of the particular arrangement of delay elements 203, 204, allowed transitions from each of the four "current" states 00, 01, 10 and 11 shown on the left-hand portion of FIG. 3 to the four "next" states on the right in FIG. 3 are limited. For each current state, transitions to only next states are allowed; the allowed next states are determined by the two possible values of $x'_{n,3}$ and the stored value of $x'_{n-1,3}$. More specifically, for current state 00, $x'_{n-1,3}=0$, and transitions are permitted only to next states 00 and 01 for $x'_{n,3}=0$ and 1, respectively. Transitions from current state 01 are permitted only to next states 10 and 11 while transitions from states 10 and 11 are similarly limited to the two allowable next states shown in FIG. 3. For each allowed transition, FIG. 3 contains an indication of the value (1 or 0) of $x'_{n,3}$ which produces a given next state.

The significance of convolutional encoding can also be appreciated by understanding the relationship of the input and output bits applied to and generated by convolutional encoder 260 of FIG. 2, as illustrated in Table 1 below:

TABLE 1

| Current State $x'_{n-2,3}\,x'_{n-1,3}$ | Input $x'_{n,3}$ | Next State $x'_{n-1,3}\,x'_{n,3}$ | Output $y_{n,3}\,y_{n,4}$ |
|---|---|---|---|
| 00 | 0 | 00 | 00 |
|  | 1 | 01 | 11 |
| 01 | 0 | 10 | 01 |
|  | 1 | 11 | 10 |
| 10 | 0 | 00 | 11 |
|  | 1 | 01 | 00 |
| 11 | 0 | 10 | 10 |
|  | 1 | 11 | 01 |

As shown in Table 1, for each of the four possible current states (00, 01, 10 or 11), the outputs $y_{n,3}$ and $y_{n,4}$ of convolutional encoder 260 can assume only two out of four possible pairs of values. For example, if the current state is 00, then $y_{n,3}$ and $y_{n,4}$ can be either 00 or 11 (but not 01 or 10), depending on the value of the current input bit $x'_{n,3}$ on line 204-3. Since the next state which can follow any current state is limited to two out of four possible states, only certain sequences of groups of bits $y_{n,3}$ and $y_{n,4}$ are allowed at the output of convolutional encoder 260. By combining the two coded bits $y_{n,3}$ and $y_{n,4}$ output from convolutional encoder 260 on lines 206-3 and 206-4, respectively, with the three uncoded bits $y_{n,0}$, $y_{n,1}$ and $y_{n,3}$ on lines 206-0 through 206-2, respectively, the previous statement also says that only certain sequences of groups of bits $y_{n,0}$, $y_{n,1}$, $y_{n,2}$, $y_{n,3}$, and $y_{n,4}$ on lines 206-0 through 206-4, respectively, are allowed by convolutional encoder 260.

As stated previously, the group of five bits $y_{n,0}$, $y_{n,1}$, $y_{n,2}$, $y_{n,3}$ and $y_{n,4}$ on lines 206-0 through 206-4, respectively, is used to determine the values of coordinates $a_n$ and $b_n$ which are subsequently used to modulate a QAM carrier. Conceptually, these coordinates are determined by mapping each group of five bits to a signalling alphabet in an expanded set of $2^5=32$ signalling alphabets, such that the horizontal and vertical positions of the signalling alphabet represent $a_n$ and $b_n$, respectively. (Conventionally, in order to transmit 4 bits in a signalling interval, a set of $2^4=16$ signalling alphabets would suffice).

Figure 4:
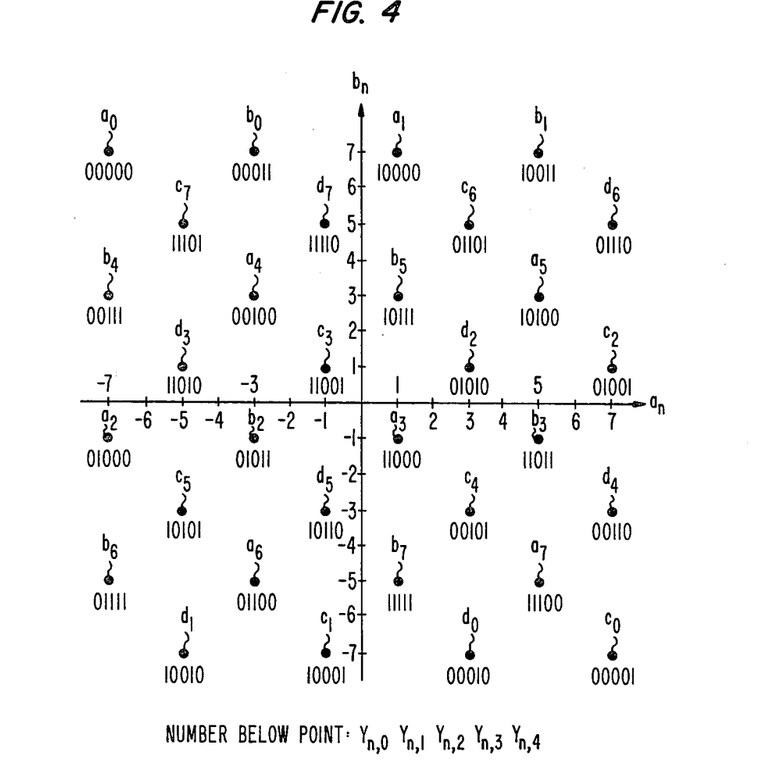
FIG. 4 illustrates an expanded set of signalling alphabets which associates the outputs from convolutional encoder 260 of FIG. 2 with the coordinates used to modulate the in-phase and quadrature phase components of a carrier signal.

The expanded signal constellation illustrated in FIG. 4, commonly referred to as 32-AMPM, includes a total of 32 points, called signalling alphabets, arranged in a series of eight rows and columns. Designations $a_0$–$a_7$, $b_0$–$b_7$, $c_0$–$c_7$ and $d_0$–$d_7$ uniquely identify each alphabet. The vertical position of each alphabet is used to determine the coordinate $b_n$ while the horizontal or x position determines the coordinate $a_n$. Both $a_n$ and $b_n$ can be negative or positive, and the expanded signal constellation illustrated in FIG. 4 includes normalized possible coordinates of $\pm 1$, $\pm 3$, $\pm 5$ and $\pm 7$ for both $a_n$ and $b_n$.

As will be explained in more detail below, one necessary attribute of the expanded signal constellation of FIG. 4 is its 180 degree symmetry. This means that if the expanded signal constellation is rotated by 180 degrees, the locations of the rotated signalling alphabets will correspond to the locations in the unrotated (original) signalling alphabets. For example, signalling alphabet $d_7$ (having coordinates $-1,5$) when rotated by 180 degrees, would be located at coordinates $1,-5$, the location of the original signalling alphabet $b_7$. Likewise, signalling alphabet $a_5$ at coordinates 5,3 when rotated by 180 degrees, corresponds to the location of the original signalling alphabet $c_5$. On the other hand, symmetry of any amount of degrees other than K times 180 degrees (where K is any integer) is absent from the expanded signal constellation of FIG. 4; if the expanded signal constellation is rotated by any amount of degrees other than K times 180 degrees, the locations of the rotated signalling alphabets will not match the locations of the original signalling alphabets.

In accordance with the present invention, the association between the group of bits $y_{n,0}$, $y_{n,1}$, $y_{n,2}$, $y_{n,3}$ and $y_{n,4}$ on lines 206-0 through 206-4, respectively, and the expanded set of signalling alphabets of FIG. 4 must follow certain rules (described below) in order to achieve the coding gain associated with convolutional encoding and yet provide resolution at the receiver of phase ambiguity of the expanded signal constellation being used. The particular association shown in FIG. 4 can be used in conjunction with differential encoder 250 and convolutional encoder 260 shown in FIG. 2, but alternatives are also possible.

In FIG. 4, the 5-bit code appearing beneath each alphabet indicates the values of the five bits $y_{n,0}$, $y_{n,1}$, $y_{n,2}$, $y_{n,3}$, and $y_{n,4}$ on lines 206-0 through 206-4, respectively. Thus, for example, when $y_{n,0}$, $y_{n,1}$, $y_{n,2}$, $y_{n,3}$ and $y_{n,4}$ are equal to 1, 0, 1, 1 and 1, respectively, the associated signalling alphabet is $b_5$ whose coordinates $a_n$ and $b_n$ are equal to 1 and 3 respectively.

The manner in which the group of five bits $y_{n,0}$, $y_{n,1}$, $y_{n,2}$, $y_{n,3}$ and $y_{n,4}$ is assigned to a signalling alphabet in FIG. 4 must first assure that coding gain is preserved. This is accomplished by using the principles set forth in the Ungerboeck's patent cited above which are set forth in more detail below. Because the present invention advantageously uses differential encoding to enable data recovery in spite of 180 degree phase ambiguity of the expanded signal constellation being used, additional requirements are imposed. In particular, the mapping must be such that if the sequence ... $x'_{n-1,3}$, $x'_{n,3}$, $x'_{n+1,3}$ ... of bits applied to convolutional encoder 260 is inverted, the effect must be the same as a 180 degree rotation of the signalling alphabets produced at the output of the mapping device. If this condition is satisfied, then when the received sequence of signalling alphabets is rotated by 180 degrees relative to the transmitted sequence of signalling alphabets, the effect on the output of the corresponding convolutional decoder in the receiver would be inversion of the sequence of bits that correspond to the sequence ... $x'_{n-1,3}$, $x'_{n,3}$, $x'_{n+1,3}$ ... applied to convolutional encoder 260. The remaining three decoded sequences, corresponding to sequences ... $x'_{n-1,0}$, $x'_{n,0}$, $x'_{n+1,0}$ ..., ... $x'_{n-1,1}$, $x'_{n,1}$, $x'_{n+1,1}$ ... and ... $x'_{n-1,2}$, $x'_{n,2}$, $x'_{n+1,2}$ ... in the transmitter which are not processed by the convolutional encoder, will not be inverted. Accordingly, the output of the corresponding convolutional decoder, when subsequently differentially decoded, will yield the input binary sequence in its original form prior to differential encoding. The conclusion that the input binary sequence in its original form prior to differential encoding can be recovered in the receiver despite inversion of bits at the otput of the convolutional decoder, is illustrated in Table 2 below:

Verification that the mapping of the groups of bits $y_{n,0}$, $y_{n,1}$, $y_{n,2}$, $y_{n,3}$ and $y_{n,4}$ to the expanded signal constellation shown in FIG. 4 satisfies the requirement of the rule stated above can be illustrated by first referring to Table 3, which illustrates the outputs (col. 2) produced by convolutional encoder 260 for all possible sequences of input bits $x'_{n,3}$, $x'_{n-1,3}$, $x'_{n-2,3}$ in col. 1.

TABLE 3

| Input Sequence to Convolutional Encoder 260 | | | Encoder Output | Inverted Input Sequence to Convolutional Encoder 260 | Encoder Output |
|---|---|---|---|---|---|
| $x'_{n,3}$ | $x'_{n-1,3}$ | $x'_{n-2,3}$ | $y_{n,3} y_{n,4}$ | $x'_{n,3} x'_{n-1,3} x'_{n-2,3}$ | $y_{n,3} y_{n,4}$ |
| 0 | 0 | 0 | 00 | 111 | 01 |
| 0 | 0 | 1 | 11 | 110 | 10 |
| 0 | 1 | 0 | 01 | 101 | 00 |
| 0 | 1 | 1 | 10 | 100 | 11 |
| 1 | 0 | 0 | 11 | 011 | 10 |
| 1 | 0 | 1 | 00 | 010 | 01 |
| 1 | 1 | 0 | 10 | 001 | 11 |
| 1 | 1 | 1 | 01 | 000 | 00 |

If the input sequences are inverted, as shown in col. 3 of Table 3, the outputs of convolutional encoder 260 are shown in col. 4. Inspection of FIG. 4 and Table 3 reveals that the associated signalling alphabets are rotated by 180 degrees when the inputs bits $x'_{n,3}$, $x'_{n-1,3}$ and $x'_{n-2,3}$ of convolutional encoder 260 are all inverted. For example, when the bits $x'_{n,0}, x'_{n,1}$, $x'_{n,2}, x'_{n,3}$, $x'_{n-1,3}$ and $x'_{n-2,3}$, which are the bits used to derive the current group of bits $y_{n,0}, y_{n,1}, y_{n,2}, y_{n,3}$ and $y_{n,4}$ at the input to the mapping device, are equal to 1,0,1,0,1 and 1, respectively, the bits $y_{n,0}, y_{n,1}, y_{n,2}, y_{n,3}$ and $y_{n,4}$ are equal to 1,0,1,1 and 0, respectively, and the mapped signalling alphabet is $d_5$. Now, when the input bits $x'_{n,3}, x'_{n-1,3}$ and $x'_{n-2,3}$ to convolutional encoder 260 are all inverted, the bits $x'_{n,0}, x'_{n,1}$, $x'_{n,2}, x'_{n,3}$ and $x'_{n-2,3}$ become 1, 0, 1, 1, 0 and 0, respectively, and the bits $y_{n,0}, y_{n,1}, y_{n,2}, y_{n,3}$ and $y_{n,4}$ become 1, 0, 1, 1 and 1, respectively, and the

TABLE 2

| | Differential Encoder | | | Differential Decoder | | |
|---|---|---|---|---|---|---|
| Col. 1 Input | Col. 2 Previous Output | Col. 3 Regular Output | Col. 4 Inverted Output | Col. 5 Previous Input | Col. 6 Output With Regular Input | Col. 7 Inverted Previous Input | Col. 8 Output With Inverted Input And Inverted Previous Input |
| 1 | 1 | 0 | 1 | 1 | 1 | 0 | 1 |
| 1 | 0 | 1 | 0 | 0 | 1 | 1 | 1 |
| 0 | 1 | 1 | 0 | 1 | 0 | 0 | 0 |
| 0 | 0 | 0 | 1 | 0 | 0 | 1 | 0 |

As shown in Table 2, the output of a differential encoder (col. 3) is obtained by logically exclusively OR'ing the input (col. 1) and the previous encoder output (col. 2). If the output is inverted, the result is shown in col. 4. In the decoder, the output in (col. 6) is obtained by logically exclusively OR'ing the received encoded bits (col. 3) with the previous input (col. 5), and is identical to the original input (col. 1). If an inversion occurs, the values in col. 4 are processed as decoder inputs. In this case, the previous inputs (col. 5) are also inverted (col. 7). When the decoder output is formed by using the values in cols. 4 and 7, the output in col. 8, identical to the original input, is again produced. Accordingly, differential encoding and decoding allows recovery of the original data even when the sequence of bits input to the differential decoder is the inverted version of the sequence of bits output from the differential encoder.

mapped signalling alphabet becomes $b_5$, which is the alphabet obtained when alphabet $d_5$ is rotated by 180 degrees.

Figure 5:
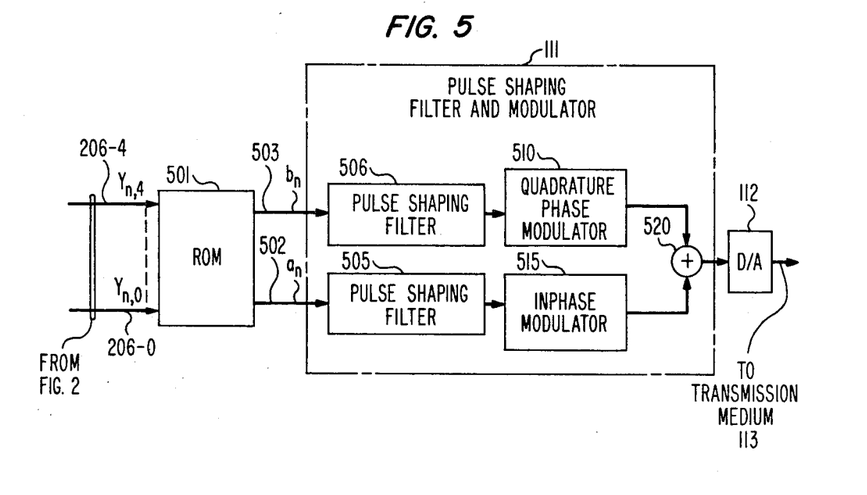
FIG. 5 is a block diagram of apparatus for mapping the outputs of the convolutional encoder to associated coordinates used to modulate in-phase and quadrature phase components of a QAM modulated carrier signal.

As shown in FIG. 5, which illustrates the apparatus used to implement the remainder of the transmitter of FIG. 1, the mapping between the groups of bits $y_{n,0}$ through $y_{n,4}$ and the coordinates $a_n$ and $b_n$ of the signalling alphabets in the constellation of FIG. 4, can be simply accomplished in a read only memory (ROM) 501 which provides two output values $a_n$ and $b_n$ on lines 502 and 503, respectively, for each five bit input on lines 205-0 through 206-4. These coordinate values are then processsed conventionally before transmission over analog medium 113. Generally, such processing includes pulse shaping of $a_n$ and $b_n$ in filters 505 and 506, subsequent modulation in modulators 515 and 510 of respective in-phase and quadrature phase carriers by the filter outputs, combination of the two modulated outputs in adder 520 and digital to analog conversion in converter 112 before application to transmission medium 113. Details of the filtering and modulating operations just described are well known to those skilled in the art, and are available in many references such as a paper by D. D. Falconer entitled "Jointly Adaptive Equalization and Carrier Recovery in Two Dimensional Digital Communication Systems", *Bell System Technical Journal*, March 1976.

In the description of FIG. 2, convolutional encoder 260 was considered as receiving a one bit input and providing an associated two bit output. Notationally, it would be more convenient to consider the convolutional encoder as having four input bits and five output bits, even though three of the bits are not processed in the convolutional encoder. Accordingly, in the following example, this method of notation is used.

Before proceeding with a description of a second embodiment of the present invention, it is important to note that in the four state code shown in FIGS. 2-4, each state transition of the convolutional encoder corresponds to eight possible combinations of bits $y_{n,0}$-$y_{n,4}$ at the output of the convolutional encoder, due to the three input bits $x'_{n,0}, x'_{n,1}$ and $x'_{n,2}$ which are not processed by the convolutional encoder. Therefore, there are eight signalling alphabets corresponding to each state transition. For the eight state code described below it will be seen that each state transition corresponds to four combinations of bits $y_{n,0}$-$y_{n,4}$ at the output of the convolutional encoder, due to the two bits $x'_{n,0}$ and $x'_{n,1}$ which are not processed by the convolutional encoder. Therefore, in that 8 state arrangement, there are four signalling constellations corresponding to each transition.

Figure 6:
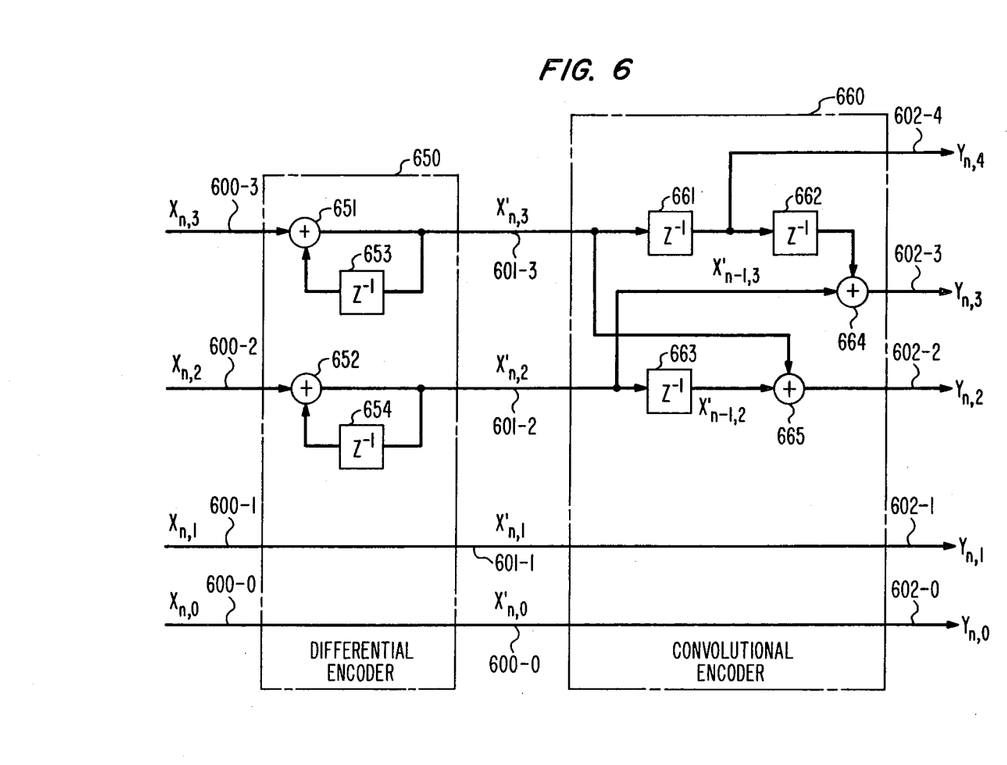
FIG. 6 is a detailed logic diagram of another embodiment of differential encoder 104 and convolutional encoder 106 of FIG. 1.
Figure 7:
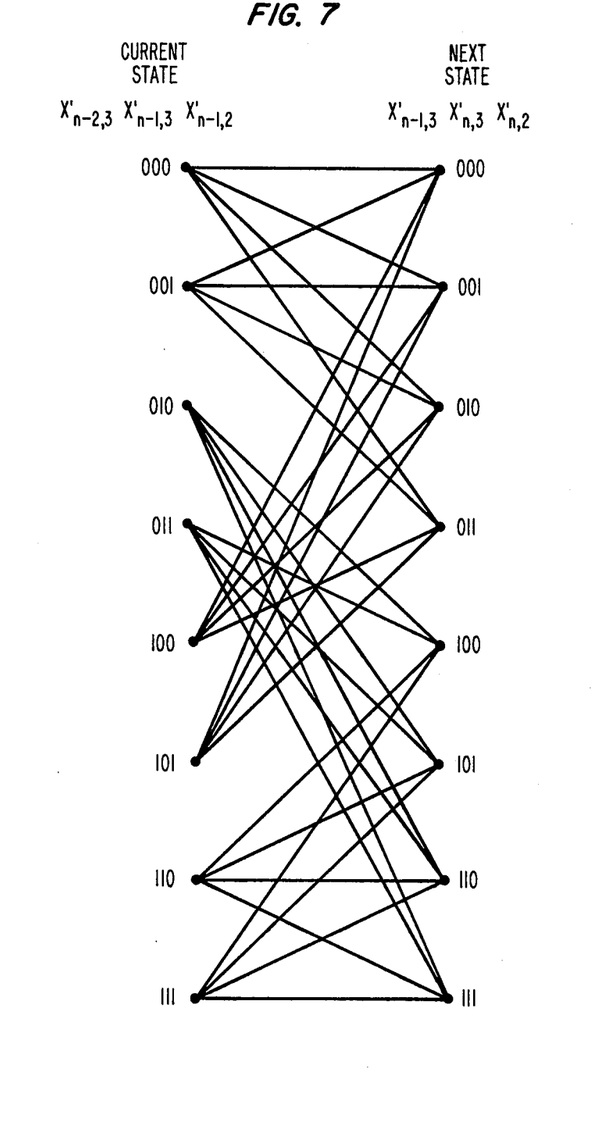
FIG. 7 is a diagram illustrating the allowed state transitions in the convolutional encoder 660 of FIG. 6.
Figure 8:
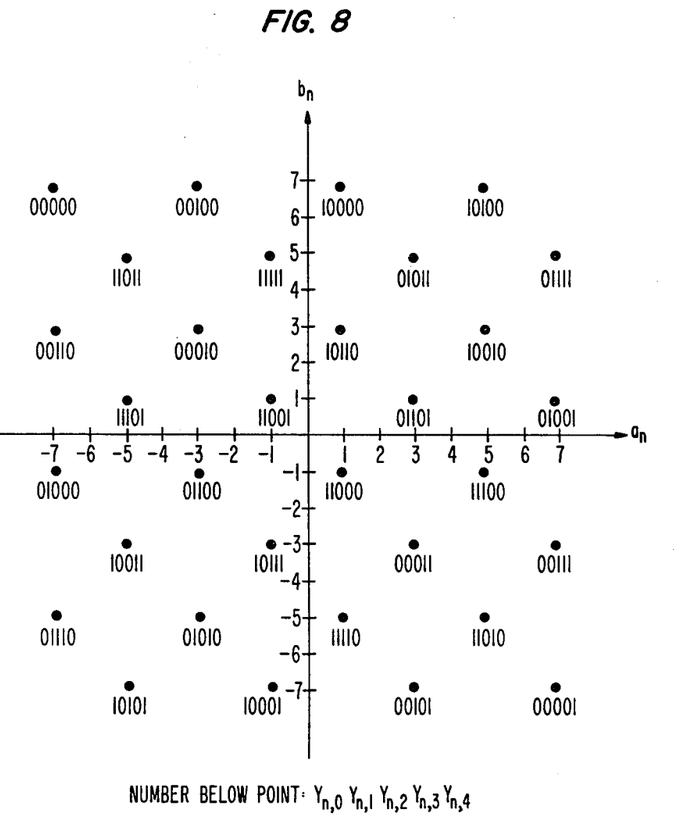
FIG. 8 illustrates an expanded set of signalling alphabets which associates the outputs from convolutional encoder 660 of FIG. 6 with coordinates used to modulate the in-phase and quadrature phase components of a carrier signal.

A second embodiment of the present invention is shown in FIGS. 6-8. While this arrangement also processes input bits in groups of r=4, two bits (c=2) in each group, after being differentially encoded, are processed by the convolutional encoder, which has eight states.

In FIG. 6, differential encoder 650 is arranged to separately process input bits $x_{n,3}$ and $x_{n,2}$, received on lines 600-3 and 600-2, respectively. Each input is combined (in an exclusive OR gate 651 or 652) with the corresponding previous encoder output $x'_{n-1,3}$, or $x'_{n-1,2}$ to yield the respective present differentially encoded output $x'_{n,3}$, or $x'_{n,2}$ on lines 601-3 and 601-2. Delay elements 653 and 654 provide the required delay of one signalling interval. Inputs $x_{n,1}$ and $x_{n,0}$ on lines 600-1 and 600-0 are not processed, but are designated $x'_{n,1}$ and $x'_{n,0}$ on lines 601-1 and 601-0 for consistency.

Both differentially encoded outputs $x'_{n,3}$ and $x'_{n,2}$ from encoder 650 are processed by convolutional encoder 660, which includes three delay elements 661, 662 and 663, the outputs of which are all used to generate an expanded three bit output $y_{n,2}$, $y_{n,3}$ and $y_{n,4}$ on lines 602-2, 602-3 and 602-4, respectively. The input/output relationship of encoder 660 is given by:

$$y_{n,4} = x'_{n-1,3} \quad (1)$$

$$y_{n,3} = x'_{n,2} \oplus x'_{n-2,3} \text{ and} \quad (2)$$

$$y_{n,2} = x'_{n,3} \oplus x'_{n-1,2} \quad (3)$$

where the symbol $\oplus$ represents the exclusive OR function provided by gates 664 and 665.

Since the values of three stored bits are used in encoder 660 to determine outputs $y_{n,2}$ through $y_{n,3}$ and $y_{n,4}$, encoder 660 has $2^3 = 8$ states. As shown in FIG. 7, the current encoder state may be designated by a three bit number representing the stored values $x'_{n-2,3}$, $x'_{n-1,3}$, $x'_{n-1,2}$; transitions from each of the 8 current states to four next states is permitted by the logic arrangement in encoder 660. Table 4 fully describes the allowed state transitions and input/output relationship for convolutional encoder 660:

TABLE 4

| Current State $x'_{n-2,3}$ $x'_{n-1,3} x'_{n-1,2}$ | Input $x'_{n,3} x'_{n,2}$ | Next State $x'_{n-1,3} x'_{n,3} x'_{n,2}$ | Output $y_{n,4}$ | $y_{n,3}$ | $y_{n,2}$ |
|---|---|---|---|---|---|
| 0000 | 00 | 000 | 0 | 0 | 0 |
|      | 01 | 001 | 0 | 1 | 0 |
|      | 10 | 010 | 0 | 0 | 1 |
|      | 11 | 011 | 0 | 1 | 1 |
| 001  | 00 | 000 | 0 | 0 | 1 |
|      | 01 | 001 | 0 | 1 | 1 |
|      | 10 | 010 | 0 | 0 | 0 |
|      | 11 | 011 | 0 | 1 | 0 |
| 010  | 00 | 100 | 1 | 0 | 0 |
|      | 01 | 101 | 1 | 1 | 0 |
|      | 10 | 110 | 1 | 0 | 1 |
|      | 11 | 111 | 1 | 1 | 1 |
| 011  | 00 | 100 | 1 | 0 | 1 |
|      | 01 | 101 | 1 | 1 | 1 |
|      | 10 | 110 | 1 | 0 | 0 |
|      | 11 | 111 | 1 | 1 | 0 |
| 100  | 00 | 000 | 0 | 1 | 0 |
|      | 01 | 001 | 0 | 0 | 0 |
|      | 10 | 010 | 0 | 1 | 1 |
|      | 11 | 011 | 0 | 0 | 1 |
| 101  | 00 | 000 | 0 | 1 | 1 |
|      | 01 | 001 | 0 | 0 | 1 |
|      | 10 | 010 | 0 | 1 | 0 |
|      | 11 | 011 | 0 | 0 | 0 |
| 110  | 00 | 100 | 1 | 1 | 0 |
|      | 01 | 101 | 1 | 0 | 0 |
|      | 10 | 110 | 1 | 1 | 1 |
|      | 11 | 111 | 1 | 0 | 1 |
| 111  | 00 | 100 | 1 | 1 | 1 |
|      | 01 | 101 | 1 | 0 | 1 |
|      | 10 | 110 | 1 | 1 | 0 |
|      | 11 | 111 | 1 | 0 | 0 |

The 5 bit output from convolutional encoder 660, comprising the three processed bits $y_{n,4}$, $y_{n,3}$, $y_{n,2}$ as well as the two unprocessed bits $x'_{n,1}$, $x'_{n,0}$ input on lines 601-1 and 601-0 which are designated outputs $y_{n,1}$ and $y_{n,0}$ on lines 602-1 and 602-0 for consistency, is next associated with signalling alphabets in the 32-AMPM constellation of FIG. 8, to provide unique coordinates $a_n$, $b_n$ for each output. As with the arrangement of FIGS. 2-4, the unique arrangement of differential and convolutional encoding together with the mapping strategy illustrated in FIG. 8 permit a significant coding gain and the ability to avoid 180 degree phase ambiguity.

Figure 9:
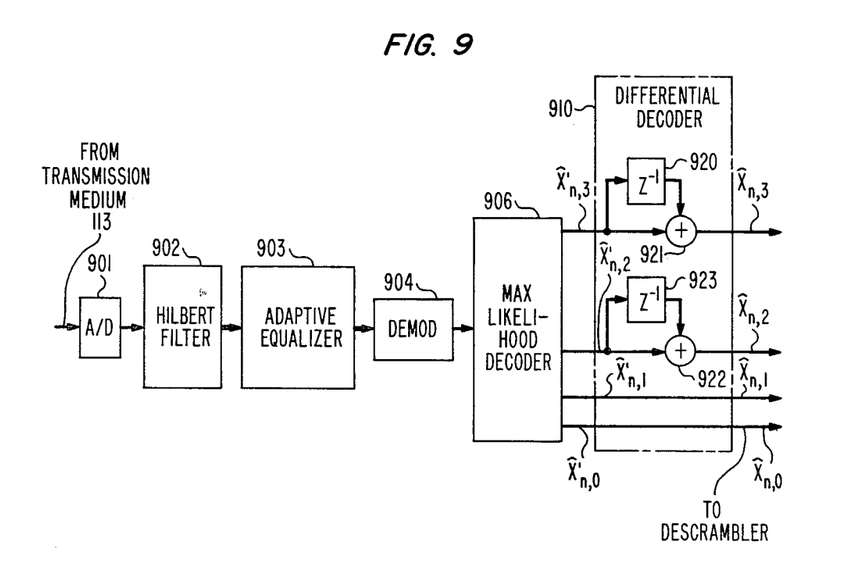
FIG. 9 is a block diagram of a receiver used to recover the original information from a modulated carrier signal processed in accordance with the principles of the present invention.

FIG. 9 illustrates the manner in which a signal modulated in accordance with the outputs of encoders 260 or 660 can be processed to recover the original binary sequence input to the differential encoder. Initially, the analog signal received from transmission medium 113 is converted to digital form in A/D converter 901 and subsequently applied to a Hilbert filter 902 and an adaptive equalizer 903, both of which are well known to those skilled in the art. The equalizer output is demodulated in demodulator 904, and the resultant signal is applied to a maximum likelihood decoder 906 such as a Viterbi decoder which produces a group of four recovered bits $\hat{x}'_{n,0}$-$\hat{x}'_{n,3}$ which correspond to the inputs to encoders 260 or 660. Finally, the recovered bits are applied to a differential decoder 910 to reproduce the original binary input sequence. If the encoder arrangement of FIG. 2 was used, only $\hat{x}'_{n,3}$ is differentially decoded using delay element 920 and exclusive OR gate 921. For the encoder arrangement of FIG. 6, differential decoder 910 also includes delay element 922 and exclusive OR gate 923 to decode $\hat{x}'_{n,2}$.

As stated previously, the association between the convolutional encoder outputs and the signalling alphabets shown in FIGS. 4 and 8 are examples which illustrate the nature of the mapping required to assure that coding gain is preserved and phase ambiguity of the expanded signal constellation being used is avoided. In accordance with the present invention, the assignment of convolutional encoder outputs to the $2^{r+1}$ signalling alphabets must concurrently satisfy several principles, keeping in mind that these principles must be used in a way which maximizes the minimum distance between allowable sequences of signalling alphabets at the output of the mapping device.

First, for each of the m possible states of the convolutional encoder, $2^r$ signalling alphabets must correspond to all possible transitions from this state to any of the permitted following m states, and the minimum distance among these $2^r$ signalling alphabets must be larger than that among the complete set of $2^{r+1}$ signalling alphabets.

Second, for each of the m possible states of the convolutional encoder, $2^r$ signalling alphabets must correspond to all possible transitions from any of the permitted previous m states to this state, and the minimum distance among these $2^r$ signalling alphabets must be larger than that among the complete set of $2^{r+1}$ signalling alphabets.

To understand the third principle, certain conventions must first be established. The m possible states of the convolutional encoder are designated as state i, where i=1,2,3 ... m. For each pair of i and j (for i,j, = 1,2,3 ... m), if there is a transition from state i to state j in the state transition diagram of the convolutional encoder, then denote $A_{i,j}$ as the set of signalling alphabets corresponding to this transition. Also denote dis($A_{i,j}$) as the minimum distance among the signalling alphabets in the set $A_{i,j}$. With these conventions in mind, then the third principle requires that all the sets $A_{i,j}$ contain the same number of signalling alphabets, and that the minimum value of dis($A_{i,j}$) for i,j=1,2 ... m be maximized.

The fourth principle can also be best explained by first establishing certain notations, as follows. First, the m possible current states of the convolutional encoder are denoted as states $S_{n,1}$ $S_{n,2}$ ... $S_{n,p}$, where n denotes the current signalling interval and p is a positive integer such that $2^p$ is equal to m, and $S_{n,i}$ (for i=1,2, ... p) is the set of previous differentially encoded binary digits which are used to determine the current state. Second, for each pair of current state $S_{n,1}$ $S_{n,2}$ ... $S_{n,p}$ and the next state $S_{n+1,1}$ $S_{1,2}$ ... $S_{n+1,p}$ denote U as the set of signalling alphabets corresponding to the transition between these two states and V as the set of signalling alphabets obtained by rotating all the signalling alphabets in the set U by 180 degrees. With these notations in mind, it is then required that the set of signalling alphabets corresponding to the transition from state $\overline{S}_{n,1}$ ... $\overline{S}_{n,2}$ ... $\overline{S}_{n,p}$ to state $\overline{S}_{n+1,1}\overline{S}_{n+1,2}$ ... $\overline{S}_{n+1,p}$ be set V, where the symbol "$-$" appearing over a value denotes an inversion.

The foregoing form principles that govern the assignment of sets of signalling alphabets to the state transitions of the convolutional encoder, or more precisely, to the sets of output bit combinations associated with state transitions of the convolutional encoder. To further assign the signalling alphabets in a set to the output bit combinations in an associated set, we need the following fifth principle. Note that the output bit combination in a set is determined by the group, denoted as w, of differentially encoded bits appearing at the input of the convolutional encoder, which does not affect the state transition of the convolutional encoder. The fifth principle requires that when the expanded signal constellation is rotated by 180 degrees, the effect of every group w of bits at the output of corresponding convolutional decoder is consistent, such that either some or all or none of the bits in those groups are inverted.

Based on the five principles cited above, the achievable maximized minimum distance between allowable sequences of signalling alphabets at the output of the mapping device remains the same as that which can be achieved by only using rules required in Ungerboeck's technique. Hence, the present invention permits preservation of coding gain while the phase ambiguity of the expanded signal constellation being used is removed.

Application of the foregoing principles to the embodiment shown in FIGS. 2–4 will illustrate more clearly their meaning. In the constellation of FIG. 4, four sets A,B,C, and D of signalling alphabets may be defined such that for i=1,2 ... 7, A={$a_i$}, B={$b_i$}, C={$c_i$} and D={$d_i$}. Observation of FIG. 4 reveals that transitions originating from the same state receive signals either from the union of sets A and B or the union of sets C and D, and the minimum distance among the signalling alphabets in the union of sets A and B or the union of sets C and D is larger than the minimum distance among the complete set of signalling alphabets, thus satisfying the first principle.

Likewise, transitions joining in the same state receive signals from either the union of sets A and B or the union of sets C and D, satisfying the second principle.

Sets A, B, C and D all have eight elements, satisfying the first requirement in the third principle. The third principle further requires that the smallest of the minimum distances between the points in each set A, B, C or D be maximized, which is verified by inspection of FIG. 4; if the location of any signalling alphabet in a set is switched with an alphabet in another set, it is quite clear that the smallest of the minimum distances between the points in each newly created set A, B, C or D will be undesirably reduced, in violation of the principle.

In the arrangement of FIGS. 2–4, m=4, p=2, and the previous differentially encoded binary digits which are used to determine the current state are $x'_{n-2,3}$ and $x'_{n-1,3}$. For given values of $x'_{n-2,3}$ and $x'_{n-1,3}$ such as 01, and for a transition to (arbitrarily chosen) next state 10, the output of convolutional encoder 260 is 01 (as shown in Table 3). If both current and next states are inverted, as stated in the fourth principle, the corresponding transition from state 10 to state 01 results in an output 00 from encoder 260, (again as determined from Table 3). Inspection of FIG. 4 reveals that the set U of alphabets corresponding to transitions between states 01 and 10 is set C, while the set V corresponding to transitions between states 10 and 01 is set A. As required, sets A and set C replace each other when all of the signalling alphabets are rotated by 180 degrees.

In FIG. 2, the differentially encoded bits which do not affect the state transition of the convolutional encoder are $x'_{n,0}$, $x'_{n,1}$ and $x'_{n,2}$. As noted previously, when the bits $x'_{n,0}$, $x'_{n,1}$ and $x'_{n,2}$ are not inverted and bit $x'_{n,3}$, which affects the state transition of the convolutional encoder, is inverted, the result is a rotation by 180 degrees of the sequence of signalling alphabets at the output of the mapping device. Therefore, when the corresponding convolutional decoder is applied to the 180 degree rotated sequence of signalling alphabets output from the mapping device, there is no effect on bits $x'_{n,0}$, $x'_{n,1}$ and $x'_{n,2}$, satisfying principle 5.

Figure 10:
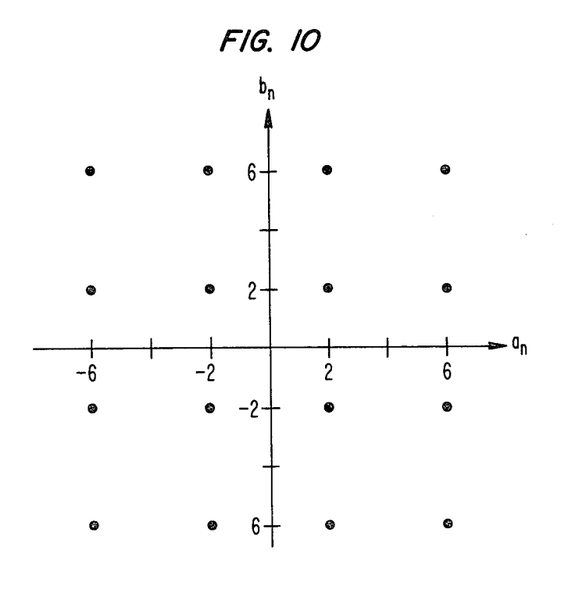
FIG. 10 illustrates a conventional 16 point QAM signal constellation for the purposes of comparison.

For the 4-state code illustrated in the embodiment of FIGS. 2-4, the average signal power is 42 and the minimum distance between allowable sequences of signalling alphabets is 32. In order to gauge its usefulness, it is to be noted that in the uncoded case, signal constellations of 16 signalling alphabets should be used, one of which (referred to as 16-QAM) is shown in FIG. 10. The average signal power of this 16-QAM constellation is 40 and the corresponding minimum distance is 16. Hence, the coding gain in minimum distance of the 4-state code used in the embodiment of FIGS. 2-4 over that obtained using encoded 16-QAM, given the same average power, is:

$$10 \log_{10}\left( \frac{32}{42} / \frac{16}{40} \right) = 2.8 \text{ dB}.$$

Furthermore, for any given allowable sequence of signalling alphabets, the average number of other allowable sequences of signalling alphabets with the minimum distance from the given sequence in the 4-state code as in FIGS. 2-4 is 2.25, while the number is 3 when uncoded 16-QAM is used. Therefore, given the same (unreasonably small) error-event probability, the coding gain in signal to noise ratio of the arrangement of FIGS. 2-4 over the uncoded 16-QAM is expected to be more than 2.8 dB. When this arrangement was tested with a real modem implementation, the experimental results showed that the 4-state coded modem offers about 3.3 dB gain in signal to noise ratio (given the same error-event probability) compared to the uncoded 16-QAM.

For the 8-state code illustrated in the embodiment of FIGS. 6-8, the minimum distance between allowable sequences of signalling alphabets is 40. Hence, the coding gain in minimum distance over the uncoded 16-QAM, given the same average power, is:

$$10 \log_{10}\left( \frac{40}{42} / \frac{16}{40} \right) = 3.77 \text{ dB}.$$

A modem implementation using this code was also tested. Experimentally, it was found that, given the same error-event probability, this arrangement shows about 3.8 dB gain in signal to noise ratio compared to the uncoded 16-QAM.

Various extensions and adaptations of the present invention may be made by those skilled in the art, and for this reason, it is intended that the present invention be limited only by the appended claims. These extensions fall into several categories, and are summarized below.

First, while an expanded 32 point AMPM signal constellation is shown in both FIGS. 4 and 8, various other expanded constellations can be used instead, as long as they have the desired properties. As stated previously, the expanded constellation must permit only 180 degree phase ambiguity, so that rotations of any other amount of degrees will not give the original expanded constellation. A one dimensional signal constellation, symmetrical to the origin, always satisfies this requirement, and can thus also be used. Also, the 8-AMPM constellation shown in FIG. 1 of a paper by G. Ungerboeck entitled "Channel Coding with Multilevel/Phase Signals", *IEEE Transactions on Information Theory*, Vol. IT-28, No. 1, January, 1982, can be used when $r=2$. For a given value of r, the expanded signal constellation must, of course, include $2^{r+1}$ alphabets.

Second, while particular circuits were shown for implementing differential encoding and decoding, it is well known to use equivalent circuits or lookup tables. When bit sequences derived from more than one position in each group of r input bits are to be differentially encoded, individual differential encoders can be used, or a single differential encoder can be used to process several sequences. In this event, the bits in each sequence can first be interleaved, applied to a single differential encoder in sequence, and then separated before application to the convolutional encoder. Furthermore, while the differential encoder of FIG. 2 does not differentially encode inputs on lines 202-2, 202-1 and 202-0, these inputs can be differentially coded also, as long as corresponding differential decoding is provided in the receiver. Note that for different arrangements of differential encoding, appropriate modifications may be required in the mapping device.

Third, many different implementations and arrangements for providing convolutional encoding are possible. For example, the logic arrangement shown in the upper portion of FIG. 9 in the above cited Ungerboeck paper which implements a rate ½ convolutional code, can replace convolutional encoder 260 of FIG. 2 and provide the same amount of coding gain. In general, the mapping of the encoder outputs to the signal constellation may then require appropriate modification.

Fourth, the manner in which the outputs of the convolutional encoder are assigned to the signalling alphabets can be modified in various ways which do not affect the ability of the present invention to yield the desired results. Some changes can indeed be made without modifying the arrangement of the differential and convolutional encoders. Specifically, if k bits output from the differential encoder, which do not affect the state transition of the convolutional encoder, appear at the input to the mapping device (whether or not processed by the convolutional encoder), these bits can form $2^k$ combinations. These $2^k$ combinations can then be arbitrarily assigned to the $2^k$ signalling alphabets in a first family. In addition, the initial association between a particular set of signalling alphabets and a particular state transition can also be made arbitrarily, but the remaining associations must then follow the rules stated above. In general, a mapping of the outputs of the convolutional encoder to the signalling alphabets is acceptable if inversion of some of the bits appearing at the input of the convolutional encoder results in rotation by 180 degrees of the sequence of signalling alphabets produced at the output of the mapping device.

It also is to be noted here that the functions performed in the differential encoder, convolutional encoder and mapping device are all digital, and that it is possible to arrange a single read only memory to receive the original input sequence and generate the appropriate coordinates $a_n$ and $b_n$, in accordance with the particular relationships expressed in the foregoing detailed description. Such an implementation would nevertheless use the principles of the present invention to derive the information needed to initially enter the ROM. Alternatively, all of the operations performed by the differential and convolutional encoders and the mapping device can be performed in finite state logic, or a combination of logic and lookup tables can be used.

What is claimed is:

1. A method for transmitting a bit sequence by modulating a carrier signal to sequentially assume one of a plurality of discrete signal values, comprising the steps of:
   (a) differentially encoding at least one bit in each group of r bits in said sequence in accordance with the values of previous differentially encoded r bit groups,
   (b) expanding each differentially encoded r bit group into a group of r+1 bits by a convolutional coding process utilizing m interval states, the current state of said convolutional code being determined by m bits in previous differentially encoded r bit groups,
   (c) selecting one out of $2^{r+1}$ discrete carrier signal values in a signal constellation as a function of each expanded r+1 bit group, the selection being made so that $2^{r-q}$ carrier signal values correspond to each permitted transition from one internal state of the coding process to m possible following states of the coding process, where q is an integer such that $2^q$ is the number of permitted following states from a current given state, and that the smallest of the minimum distances among the $2^{r-q}$ carrier signal values in each of the $2^{q+1}$ sets is maximized, and
   (d) transmitting the selected discrete carrier signal values in sequence,
   wherein said signal constellation is arranged so that the same signal constellation is obtained when (and only when) the original constellation is rotated by 180 degrees, and wherein
   rotation of said constellation by 180 degrees produces the same effect on said transmitted discrete carrier signal values as inversion of said at least one differentially encoded bit in each r bit group.

2. A technique for modulating in-phase and quadrature phase carriers in accordance with an applied sequence of binary digits, including the steps of:
   (a) differentially encoding at least one of the binary digits in each group of r bits in said applied sequence,
   (b) encoding each differentially encoded r bit group into an associated r+1 bit group in accordance with an m state convolutional code, the current state of said convolutional code being determined in accordance with bits in previous differentially encoded r bit groups,
   (c) associating each expanded r+1 bit group produced by said convolutional code with a signalling alphabet in a two-dimensional constellation, and
   (d) modulating said in-phase and quadrature phase carriers in accordance with the coordinates of said signalling alphabets,
   wherein said signalling alphabets are arranged in said constellation such that
     (1) the $2^r$ alphabets which correspond to all permitted transitions from each state of said convolutional code to m possible following states of said convolutional code, have a larger minimum distance than the complete set of $2^{r+1}$ signalling alphabets,
     (2) the $2^r$ alphabet which correspond to all permitted transitions from m possible previous states of said convolutional code to each current state of said convolutional code have a larger minimum distance than the complete set of $2^{r+1}$ signalling alphabets,
     (3) the coordinates of all signalling alphabets in said constellation are preserved when said constellation is rotated by 180 degrees, and
     (4) inversion of said at least one differentially encoded bit in each r bit group results in association of the produced r+1 bit group with the signalling alphabet in said rotated constellation which corresponds to the alphabet in the original constellation associated with the r+1 bit group produced without inversion.

3. A technique for modulating in-phase and quadrature phase carriers in accordance with an applied sequence of binary digits, including the steps of:
   (a) differentially encoding at least some of the binary digits in each group of r bits in said applied sequence,
   (b) expanding c bits in each group of r differentially encoded bits into a group of c+1 bits by a convolutional encoding process utilizing m internal states, the current state of said convolutional code being determined by p bits in previous differentially encoded r bit groups, where p is an integer such that $2^p = m$, said c bits including only bits in each r bit group which are differentially encoded,
   (c) selecting one of $2^{r+1}$ signalling alphabets from a signal constellation as a function of the r+1 expanded bit group which includes said c+1 convolutionally encoded bits and the remaining r-c bits produced by said differential encoding step, the selection being made so that $2^r$ signalling alphabets correspond to all permitted transitions from each current internal state of the convolutional coding process to m possible next states of the convolutional coding process, and that the $2^r$ signalling alphabets have a larger minimum distance from each other than the minimum distance within the complete set of $2^{r+1}$ signalling alphabets, and
   (d) modulating said in-phase and quadrature-phase carriers in accordance with the sequence of selected signalling alphabets,
   wherein said signalling alphabets form a constellation having 180 degrees symmetry, the location of each signalling alphabet in said constellation being uniquely defined by its associated coordinates, the mapping between each r+1 expanded bit group and said alphabets in said signal constellation being arranged so that rotation 180 degrees results in selection of the same signalling alphabet as inversion of those differentially encoded bits in each r bit group included among the c convolutionally encoded bits.

4. A method for transmitting a bit sequence by modulating in-phase and quadrature phase carriers to sequentially assume one of a plurality of discrete values in accordance with the coordinates associated with a sequence of signalling alphabets, comprising the steps of:
   (a) differentially encoding at least one bit in each group of r sequential bits in accordance with the values of previous differentially encoded r bit groups, (b) expanding each differentially encoded r bit group into a group of r+1 bits by a convolutional coding process utilizing m internal states, the current state of said convolutional code being determined by p bits in previous differentially encoded r bit groups, where p is an integer such that $2^p = m$, (c) selecting one out of $2^{r+1}$ signalling alphabets from a signal constellation as a function of each expanded r+1 bit group, the selection being made so that $2^r$ signalling alphabets correspond to all permitted transitions from each current internal state of the coding process to possible follower states and that the $2^r$ signalling alphabets have a larger minimum distance from each other than the minimum distance within the complete set of $2^{r+1}$ signalling alphabets, and (d) modulating said in-phase and quadrature phase carriers in accordance with the sequence of selected signalling alphabets, wherein said signalling alphabets form a constellation having 180 degree symmetry, the location of each signalling alphabet in said constellation being uniquely defined by its associated coordinates, the mapping between each expanded r+1 bit group and said alphabet in said constellation being being arranged so that rotation by 180 degrees results in selection of the same signalling alphabet as inversion of said at least one differentially encoded bit in each r bit group.

5. A technique for modulating in-phase and quadrature phase carriers to assume a sequence of discrete values $a_n$ and $b_n$, respectively, in accordance with an applied sequence of bits, including:

(1) expanding each group of r bits in said applied sequence into a sequence of r+1 bits in accordance with the state of an m-state convolutional code, (2) selecting said discrete values in accordance with the coordinates of the one of $2^{r+1}$ signalling alphabets associated with the value of the bits in each expanded r+1 bit group, said selection being made so that $2^r$ over signalling alphabets correspond to all permitted transitions from each current one of said m states to m possible permitted next states, and so that the minimum distance between said $2^r$ signalling alphabets is larger than the minimum distance between the complete set of $2^{r+1}$ signalling alphabets, and (3) modulating said in-phase and quadrature-phase carriers in accordance with said selected discrete values, characterized in that (4) said technique further includes the step of differentially encoding at least some of the bits in each group of r bits before said expanding step, (5) said expanding step includes determining said internal state as a function of previous differentially encoded bits, (6) said technique further includes forming said signalling alphabets in a constellation with only 180 degree symmetry such that inversion of those of said differentially encoded bits processed in said expanding step has the same effect as rotation of said signalling alphabets by 180 degrees.

6. A technique for modulating in-phase and quadrature phase carriers in accordance with a sequence of binary digits, by associating each group of r binary digits with a signalling alphabet in a constellation, the coordinates of each alphabet determining the amplitude of said in-phase and quadratures phase modulations, respectively, including the steps of:

(a) differentially encoding at least some of the binary digits in each of said r bit groups of binary digits in accordance with the values of previous differentially encoded r bit groups, (b) expanding each differentially encoded r bit group into an associated group of r+1 bits by a convolutional code utilizing m states, the current state of said convolutional code being determined by p bits in previous differentially encoded r bit groups, where p is an integer such that $2^p = m$, and (c) selecting for each of said expanded r+1 bit groups a particular signalling alphabet in said constellation, said selection being from a set of $2^r$ alphabets which correspond to all permitted transitions from a current state of said convolutional code to m possible next states of said convolutional code, alphabets in said $2^r$ set having a larger minimum distance from each other than alphabets in the complete set of $2^{r+1}$ alphabets.

wherein said constellation is chosen such that the same constellation is obtained when the original constellation is rotated by 180 degrees, and a different constellation is obtained for other amounts of rotation, and wherein the mapping between said signalling alphabets and said groups of r+1 bits is arranged such that rotation of the sequence of mapped signalling alphabets by 180 degrees has the same effect on said modulated carriers as is obtained by inverting consistently at leas some of said differentially encoded bits in each r bit group before said expansion. differentially encoded.

* * * * *